US012175236B2

(12) United States Patent
Nomura (10) Patent No.: US 12,175,236 B2
(45) Date of Patent: Dec. 24, 2024

(54) OPERATION MANAGEMENT DEVICE AND OPERATION MANAGEMENT METHOD

(71) Applicant: HONDA MOTOR CO., LTD., Tokyo (JP)

(72) Inventor: Takumi Nomura, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 72 days.

(21) Appl. No.: 18/153,551

(22) Filed: Jan. 12, 2023

(65) Prior Publication Data

US 2023/0259353 A1 Aug. 17, 2023

(30) Foreign Application Priority Data

Feb. 15, 2022 (JP) .................................. 2022-021277

(51) Int. Cl.
*G06F 8/65* (2018.01)
*B60W 50/02* (2012.01)

(52) U.S. Cl.
CPC ............ *G06F 8/65* (2013.01); *B60W 50/0205* (2013.01); *B60W 2556/45* (2020.02)

(58) Field of Classification Search
CPC .......... G06F 8/60–66; B60W 50/0205; B60W 2556/45; G05B 23/0213; G05B 2219/24065
USPC .................................................. 717/168–178
See application file for complete search history.

(56) References Cited

FOREIGN PATENT DOCUMENTS

| JP | 2008056190 A | * | 3/2008 | |
| WO | WO-2012056773 A1 | * | 5/2012 | ............... G06F 8/65 |
| WO | WO-2017212772 A1 | * | 12/2017 | ............ B60R 16/02 |
| WO | 2021/039795 A1 | | 3/2021 | |

OTHER PUBLICATIONS

Liang, Hengyi, et al., Addressing Extensibility and Fault Tolerance in CAN-based Automotive Systems, NOCS '17: Proceedings of the Eleventh IEEE/ACM International Symposium on Networks-on-Chip, 2017, 8 pages, [retrieved on Oct. 7, 2024], Retrieved from the Internet: <URL:http://dl.acm.org/>.*

(Continued)

*Primary Examiner* — Geoffrey R St Leger
(74) *Attorney, Agent, or Firm* — Rankin, Hill & Clark LLP (57) ABSTRACT

An operation management device for managing operation of a plurality of electronic control devices installed on a vehicle includes: an update management unit configured to: receive a download instruction to download updated data from an external device; and deliver the received updated data to an electronic control device and instruct the electronic control device to write the updated data, the updated data including an updated program for the electronic control device, the electronic control device being at least one of the electronic control devices, the electronic control device being a target device for downloading the updated data; and a failure diagnosis unit configured to execute failure diagnosis for the electronic control devices, wherein when the update management unit instructs any of the electronic control devices to write the updated data, the update management unit prohibits the failure diagnosis unit from executing the failure diagnosis.

6 Claims, 3 Drawing Sheets

(56) References Cited

OTHER PUBLICATIONS

Mansour, Karim, et al., AiroDiag: A sophisticated tool that diagnoses and updates vehicles software over air, 2012 IEEE International Electric Vehicle Conference, 2012, 7 pages, [retrieved on Oct. 7, 2024], Retrieved from the Internet: <URL:http://ieeexplore.ieee.org/>.*

Li, Yang, et al., Fault Diagnosis of Automobile ECUs with data mining Technologies, Applied Mechanics and Materials, 2011, 6 pages, [retrieved on Oct. 7, 2024], Retrieved from the Internet: <URL:https://www.scientific.net/AMM.40-41.156.pdf>.*

* cited by examiner

OPERATION MANAGEMENT DEVICE AND OPERATION MANAGEMENT METHOD

INCORPORATION BY REFERENCE

The present application claims priority under 35 U.S.C. § 119 to Japanese Patent Application No. 2022-021277 filed on Feb. 15, 2022. The content of the application is incorporated herein by reference in its entirety.

BACKGROUND OF THE INVENTION

Field of the Invention

The present invention relates to an operation management device and an operation management method for managing operation of electronic control devices installed on a vehicle.

Description of the Related Art

International Publication No. WO 2021039795 discloses a vehicle electronic control system in which an in-vehicle master device delivers updated data received from an external device to an in-vehicle electronic control device and instructs the electronic control device to write the updated data to a memory. In this vehicle electronic control system, a non-volatile memory of the electronic control device stores configuration information that is set value information including various parameters to be used for control. The master device acquires old configuration information from a rewrite target electronic control device, and then instructs the rewrite target electronic control device to write back a new configuration information obtained by processing the acquired old configuration information while or after the rewrite target electronic control device rewrites the program.

In downloading updated data such as an updated program from an external device to an in-vehicle electronic control device, one configuration is such that all the electronic control devices are activated according to a procedure normally performed when the vehicle is powered on, and then the electronic control device to be updated receives updated data and is instructed to write the data. This involves a risk to activate even an electronic control device that does not need to be activated, resulting in wasteful power consumption. In contrast, another configuration is such that only a part of electronic control devices are activated without following normal procedures. This disadvantageously causes the electronic control devices that have not been activated to have operational abnormality detected when all the electronic control devices are subjected to the operation diagnosis normally performed at the activation of the electronic control devices s.

It is an object of the present invention to prevent generation of unnecessary power consumption and detection of unnecessary operational abnormality of an in-vehicle electronic control device in download of updated data to the electronic control device so that the download can be performed efficiently.

SUMMARY OF THE INVENTION

An aspect of the present invention is an operation management device for managing operation of a plurality of electronic control devices installed on a vehicle, the operation management device including: an update management unit configured to: receive a download instruction to download updated data from an external device outside the vehicle; and deliver the received updated data to an electronic control device and instruct the electronic control device to write the updated data, the updated data including an updated program for the electronic control device, the electronic control device being at least one of the electronic control devices, the electronic control device being a target device for downloading the updated data; and a failure diagnosis unit configured to execute failure diagnosis for the electronic control devices, wherein when the update management unit instructs any of the electronic control devices to write the updated data, the update management unit prohibits the failure diagnosis unit from executing the failure diagnosis.

According to another aspect of the present invention, each of the plurality of electronic control devices is connected to the operation management device either directly through a communication transmission line to be able to communicate with each other or indirectly through the communication transmission line and at least one of the electronic control devices other than the electronic control device to be able to communicate with each other, and the operation management device further includes: an activation management unit configured to manage an activation configuration, the activation configuration being information indicating an activation order of the plurality of electronic control devices; and an activation unit configured to activate the electronic control devices, wherein the update management unit prohibits execution of diagnostic operation and then notifies the target device to the activation management unit based on the download instruction, the activation management unit notifies an electronic control device and an update activation configuration to the activation unit, the electronic control device being at least one of the electronic control devices, the electronic control device needing to be activated to establish communication between the update management unit and the target device, the update activation configuration being the activation configuration indicating an activation order, and the activation unit activates the electronic control device needing to be activated, according to the update activation configuration.

According to yet another aspect of the present invention, the failure diagnosis unit executes failure diagnosis for the electronic control device indicated in the update activation configuration after the activation unit activates the electronic control device according to the update activation configuration.

According to yet another aspect of the present invention, the plurality of electronic control devices, the operation management device, and the communication transmission line configure a communication network, and the communication network includes at least one transmission line switch that switches connection in the communication transmission line, the activation management unit manages a network configuration that indicates a state to be set for the transmission line switch in the communication network, the activation management unit notifies an update network configuration to the activation unit, the update network configuration being the network configuration for establishing communication between the update management unit and the target device, and the activation unit switches the transmission line switch according to the update network configuration, and then activates the electronic control device needing to be activated, according to the update activation configuration.

According to yet another aspect of the present invention, when the target device ends writing of the updated data, the update management unit prohibits the failure diagnosis unit from executing the failure diagnosis, the activation management unit notifies, to the activation unit, the network configuration used before notifying the update network configuration to the activation unit, and the activation unit switches the transmission line switch according to the network configuration notified from the activation management unit.

Yet another aspect of the present invention is an operation management method to be performed by a computer of an operation management device, the operation management device managing operation of a plurality of electronic control devices installed on a vehicle, the method including: a step of receiving a download instruction to download updated data from an external device outside the vehicle, the updated data including an updated program for an electronic control device, the electronic control device being at least one of the electronic control devices; a step of prohibiting execution of failure diagnosis for the electronic control devices; and a step of delivering the received updated data to the electronic control device and instructing the electronic control device to write the updated data, the electronic control device being a target device for downloading the updated data.

According to an aspect of the present invention, it is possible to prevent detection of unnecessary operational abnormality in the in-vehicle electronic control devices to prevent generation of unnecessary power consumption in downloading updated data to the electronic control devices, thereby leading to efficient downloading.

DETAILED DESCRIPTION OF THE PREFERRED EMBODIMENTS

The following describes embodiments of the present invention with reference to drawings.

Figure 1:
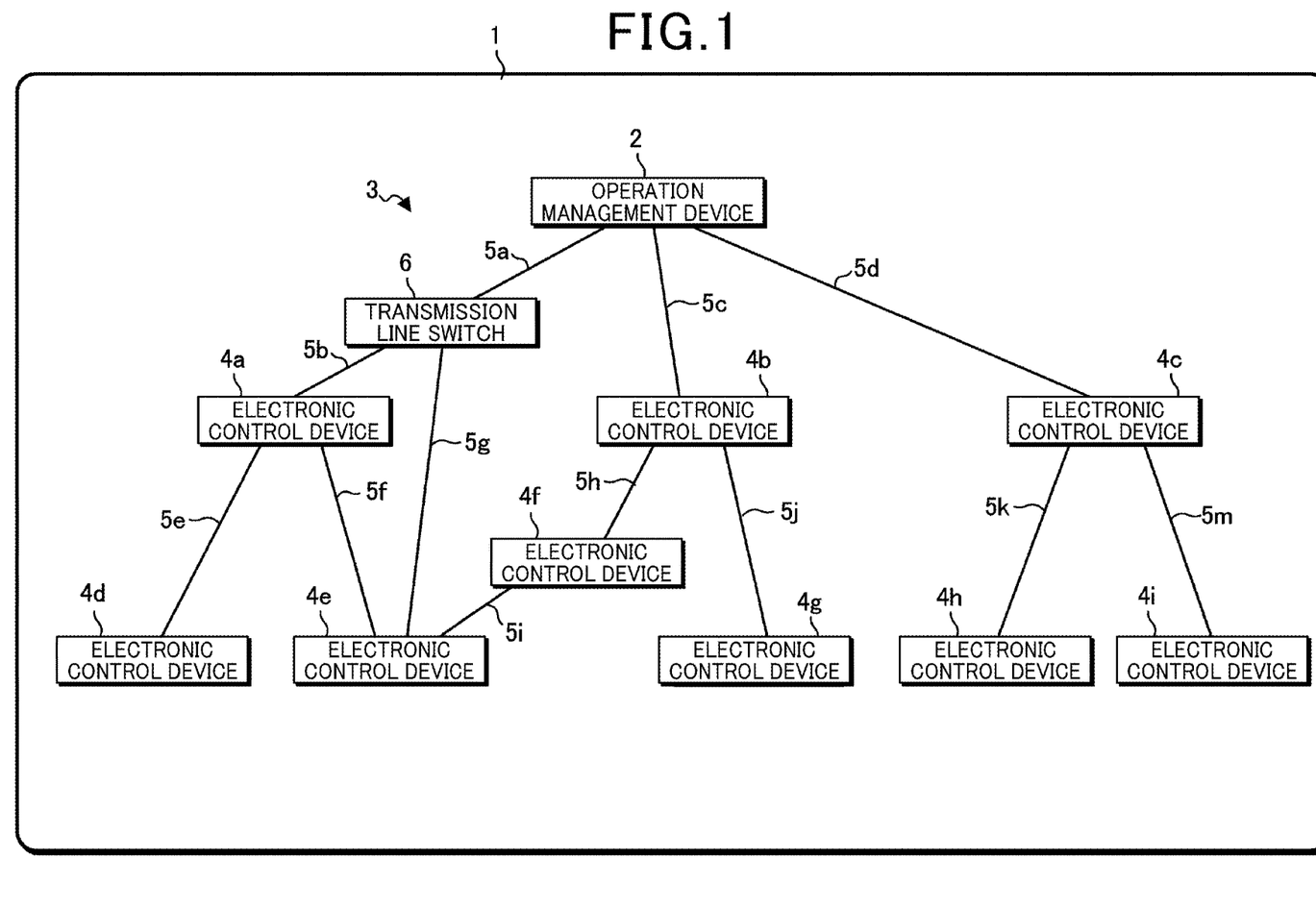
FIG. 1 is a diagram showing a configuration of an in-vehicle communication network including an operation management device according to an embodiment of the present invention.

FIG. 1 is a diagram showing a configuration of a communication network 3 installed on a vehicle 1, including an operation management device 2 according to one embodiment of the present invention. The communication network 3 includes a plurality of electronic control devices 4a, 4b, 4c, 4d, 4e, 4f, 4g, 4h, and 4i, and a transmission line switch 6 (also referred to as a transmission line SW6) in addition to the operation management device 2. Hereinafter, the electronic control devices 4a, 4b, 4c, 4d, 4e, 4f, 4g, 4h, and 4i are collectively referred to as the electronic control devices 4 as well.

The transmission line switch 6 switches connection in a communication transmission line 5 according to instructions from the operation management device 2.

The communication network 3 also includes communication transmission lines 5a, 5b, 5c, 5d, 5e, 5f, 5g, 5h, 5j, 5k, and 5m. Hereinafter, the communication transmission lines 5a, 5b, 5c, 5d, 5e, 5f, 5g, 5h, 5j, 5k, and 5m are collectively referred to as a communication transmission line 5. In the communication network 3, each of the plurality of electronic control devices 4 is directly connected to the operation management device via the communication transmission line 5 to be able to communicate with each other, or each of the devices is indirectly connected to the operation management device 2 via the communication transmission line 5 and any of the other electronic control devices 4 to be able to communicate with each other.

The operation management device 2 manages the operation of the plurality of electronic control devices 4 installed on the vehicle 1.

Figure 2:
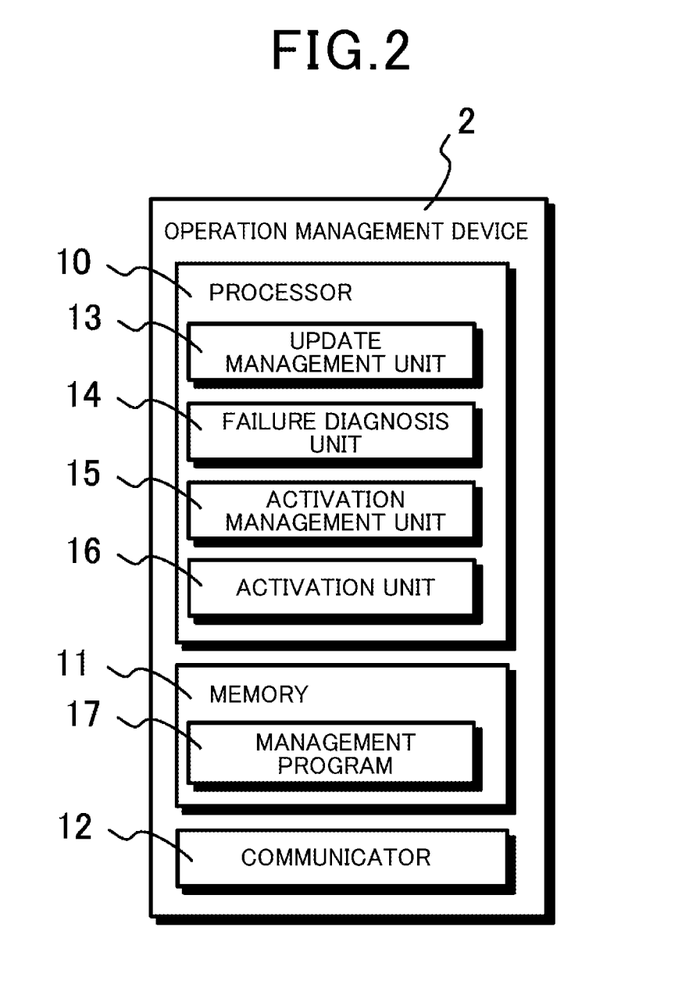
FIG. 2 is a diagram showing a configuration of the operation management device.

FIG. 2 is a diagram showing the configuration of the operation management device 2. The operation management device 2 includes a processor 10, a memory 11, and a communicator 12. The memory 11 is composed of, for example, a volatile and/or non-volatile semiconductor memory. The communicator 12 is a transceiver (transmitter/receiver, circuit) for the operation management device 2 to communicate with the electronic control devices 4 and the transmission line switch 6 via the communication transmission line 5.

The processor 10 is, for example, a computer including a central processing unit (CPU), and the like. The processor 10 may have a configuration including a read only memory (ROM) in which a program is written, a random access memory (RAM) for temporarily storing data, and the like. The processor 10 includes an update management unit 13, a failure diagnosis unit 14, an activation management unit 15, and an activation unit 16, as functional elements or functional units.

These functional elements included in the processor 10 are implemented, for example, by the processor 10, which is a computer, executing a management program 17 stored in the memory 11. The management program 17 can be stored in any computer-readable storage medium. Alternatively, all or part of the functional elements of the processor 10 may be configured with hardware including one or more electronic circuit components.

The update management unit 13 receives a download instruction to download updated data, which includes an updated program for at least one electronic control device 4, from an external device (e.g. server) outside the vehicle 1. When receiving a download instruction from an external device, the update management unit 13 turns on the power of the vehicle 1, delivers the received updated data to the electronic control device 4 that is a target device for downloading the updated data, and instructs the device 4 to write the updated data.

In particular, in this embodiment, when the update management unit 13 instructs any of the electronic control devices 4 to write updated data, the update management unit 13 prohibits the failure diagnosis unit 14, which will be described later, from executing failure diagnosis. This makes it possible to prevent the electronic control devices 4 from detecting unnecessary operational abnormality and from consuming unnecessary power in downloading the updated data to the electronic control device 4, thereby leading to the efficient downloading.

The update management unit 13 prohibits execution of the diagnostic operation, and then notifies target information indicating the download target device to the activation management unit 15, which will be described later, based on the download instruction.

When the writing of the updated data ends in the electronic control device 4 that is the target device, in other words, when the update management unit 13 receives an end notification (to be described later) from the electronic control device 4 that is the target device, the update management unit 13 prohibits the failure diagnosis unit 14 from executing failure diagnosis.

The failure diagnosis unit 14 executes failure diagnosis for the electronic control devices 4 when the power of the vehicle 1 is turned on or off.

However, the failure diagnosis unit 14 does not execute failure diagnosis for the electronic control devices 4 when the failure diagnosis unit 14 is prohibited from executing failure diagnosis by the update management unit 13.

When the activation unit 16 activates the electronic control devices 4 according to the update activation configuration, in a state in which the failure diagnosis unit 14 is prohibited from executing failure diagnosis by the update management unit 13, the failure diagnosis unit 14 executes failure diagnosis for the electronic control devices 4, which are indicated in the update activation configuration, after the activation.

The electronic control device 4 that is the target device writes the updated data after the execution of the failure diagnosis. The electronic control device 4 that is the target device transmits an end notification to the operation management device 2 when the device 4 ends the writing of the updated data.

When the communicator 12 receives the end notification from the electronic control device 4 that is the target device, in a state in which the failure diagnosis unit 14 is prohibited from executing the failure diagnosis by the update management unit 13, the failure diagnosis unit 14 does not executes failure diagnosis for the electronic control devices 4. When the failure diagnosis unit 14 is prohibited from executing failure diagnosis upon receiving the end notification and then receives a switching completion notification (to be described later) from the activation unit 16, the failure diagnosis unit 14 executes the failure diagnosis for the electronic control devices 4 according to a normal (e.g. default) sequence and then turns off the power of the vehicle 1.

The activation management unit 15 manages a network configuration that indicates a state to be set for the transmission line switch 6 in the communication network 3. Based on the target information notified from the update management unit 13, the activation management unit 15 notifies, to the activation unit 16, an update network configuration that is a network configuration for establishing communication between the update management unit 13 and the target device. This allows the activation management unit 15, with the update network configuration, to inform the activation unit 16 of a state of the transmission line switch 6 that can most efficiently establish communication between the update management unit 13 and the target device in downloading updated data to the electronic control device 4.

Here, the "state of the transmission line switch 6 that can most efficiently establish communication between the update management unit 13 and the target device" may be, for example, such a state of the transmission line switch 6 that minimizes the number of other electronic control devices 4 through which updated data passes from the operation management device 2 to the electronic control device 4 that is the target device. Specifically, for example, in a case in which the transmission line switch 6 is set to connect the communication transmission lines 5a and 5b as a default setting state, the update network configuration can specify the communication transmission lines 5a and 5g to be connected when the updated data is downloaded with the electronic control device 4e as the target device. As a result, the updated data can start from the operation management device 2 and reach the electronic control device 4e that is the target device, without passing through other electronic control devices 4.

Also, the activation management unit 15 manages the activation configuration, which is information indicating the activation order of the plurality of electronic control devices 4. In this embodiment, based on the target information notified from the update management unit 13, the activation management unit 15 refers to the update network configuration, and notifies, to the activation unit 16, the electronic control device 4 needing to be activated to establish communication between the update management unit 13 and the target device, and the update activation configuration, which is the activation configuration indicating the order of activation of those electronic control devices 4. As a result, the activation unit 16 activates no unnecessary electronic control device 4, and therefore, generates no unnecessary power consumption. This makes it possible to efficiently activate the electronic control device 4 necessary for delivering updated data to the electronic control device 4 that is the target device.

When the writing of the updated data ends in the electronic control device 4 that is the target device, in other words, when the activation management unit 15 receives the end notification from the electronic control device 4 that is the target device, the activation management unit 15 notifies, to the activation unit, the network configuration used before notifying the update network configuration to the activation unit 16.

The activation unit 16 activates the electronic control devices 4. In this embodiment, the activation unit 16 switches the transmission line switch 6 according to the update network configuration notified from the activation management unit 15, and then sequentially activates the electronic control devices 4 that need to be activated according to the update activation configuration.

When the activation unit 16 completes activation of all the electronic control devices 4 that need to be activated, the activation unit 16 notifies this completion to the failure diagnosis unit 14.

When the writing of the updated data ends in the electronic control device 4 that is the target device, in other words, when the activation unit 16 receives the end notification from the electronic control device 4 that is the target device, the activation unit 16 switches the transmission line switch 6 according to the network configuration notified from the activation management unit 15 thereafter. The activation unit 16 also activates all the electronic control devices 4. The activation unit 16 then transmits a switching completion notification to the failure diagnosis unit 14.

As a result, when the activation unit 16 switches the transmission line switch 6 to change the network configuration of the communication network 3 to a state different from the normal state in downloading the updated data, the activation unit 16 can restore the configuration to the original network configuration when the vehicle 1 is powered off. Therefore, when the vehicle 1 is powered off, the failure diagnosis unit 14 can perform failure diagnosis according to a normal sequence. As described above, the activation unit 16 restores the configuration to the previous network configuration when the vehicle 1 is powered off. This makes it possible to activate the electronic control devices 4 according to the normal activation sequence in the vehicle 1 when the vehicle 1 is powered on next time, and to activate the vehicle 1 with responsiveness maintained.

Figure 3:
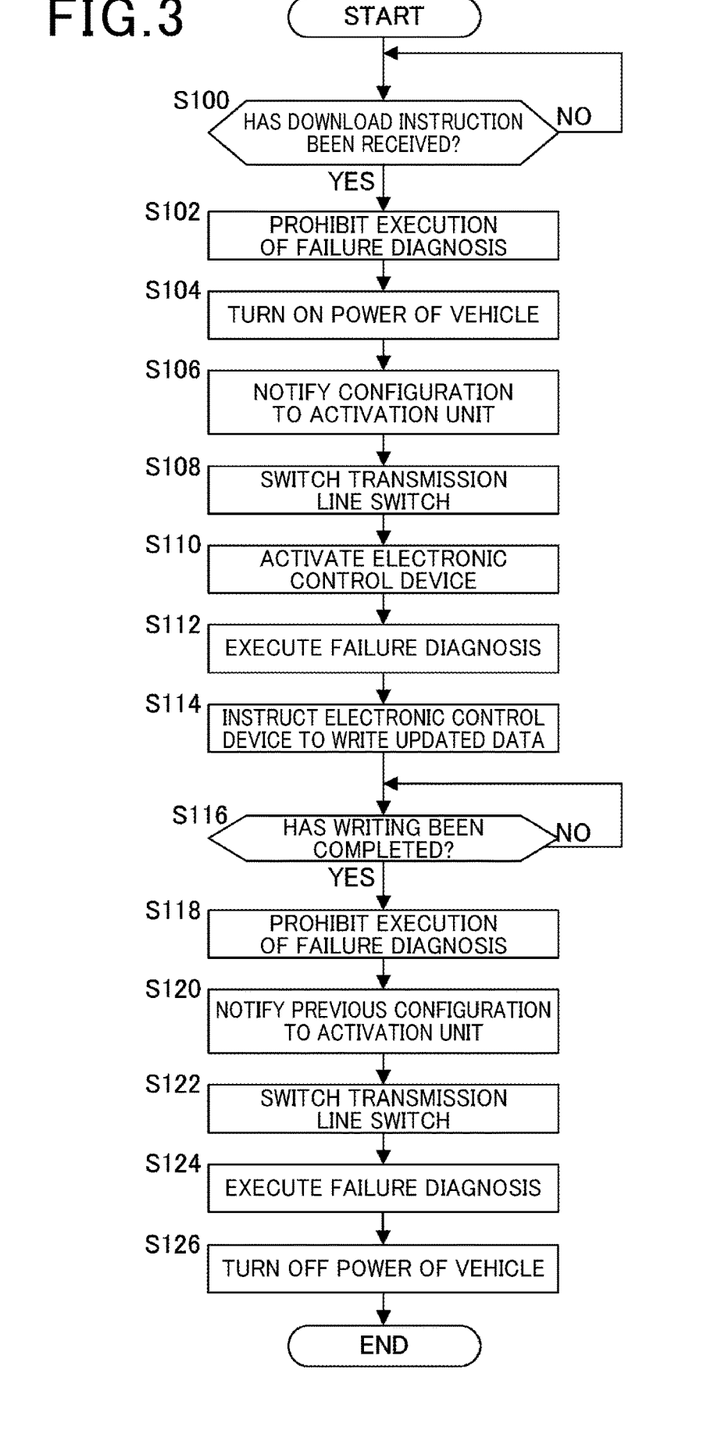
FIG. 3 is a flowchart showing an operation procedure of the operation management device.

Next, the operation procedure of the operation management device 2 will be described. FIG. 3 is a flowchart showing the procedure of processing in the operation management device 2. The processing in FIG. 3 is repeatedly executed.

When the processing starts, the update management unit 13 determines whether an updated data download instruction has been received from an external device outside the vehicle 1 (S100). If the download instruction has not been received (S100, NO), the update management unit 13 returns to step 100, repeats the processing, and waits for the download instruction to be received.

In contrast, when the download instruction has been received (S100, YES), the update management unit 13 prohibits the failure diagnosis unit 14 from executing failure diagnosis for the electronic control devices 4 (S102), and then turns on the power of the vehicle 1 (S104). The update management unit 13 also notifies, to the activation management unit 15, target information indicating the electronic control device 4 that is the target device for downloading the updated data. Based on the target information, the activation management unit 15 notifies, to the activation unit 16, the update network configuration and the update activation configuration for establishing communication between the update management unit 13 and the target device (S106).

The activation unit 16 switches the transmission line switch 6 based on the update network configuration (S108), and then sequentially activates the electronic control devices 4 based on the update activation configuration (S110). In parallel with the executing the activation, the activation unit 16 passes the update activation configuration to the failure diagnosis unit. Subsequently, the failure diagnosis unit 14 executes failure diagnosis for the electronic control device 4 indicated in the update activation configuration (S112).

Next, the update management unit 13 delivers the received updated data to the electronic control device 4 that is the target device for downloading the updated data, and instructs the device 4 to write the updated data (S114). The update management unit 13 also determines whether writing of the updated data has been completed in the electronic control device 4 that is the target device (S116). If the writing of the updated data has not been completed (S116, NO), the update management unit 13 repeats the processing of step S116 and waits for the writing of the updated data to be completed.

In contrast, when the writing of the updated data has been completed (S116, YES), the update management unit 13 prohibits the failure diagnosis unit 14 from executing failure diagnosis (S118). The activation management unit 15 also notifies, to the activation unit 16, the previous network configuration used before notifying the update network configuration to the activation unit 16 (S120). The activation unit 16 switches the transmission line switch 6 according to the previous network configuration notified from the activation management unit 15 (S122). Subsequently, the failure diagnosis unit 14 executes failure diagnosis for the electronic control devices 4 according to a normal sequence (S124), and then turns off the power of the vehicle 1 (S126), ending this processing.

Note that the present invention is not limited to the configurations of the above-described embodiments, and can be implemented in various aspects without departing from the spirit of the present invention.

The above-described embodiments support the following configurations.

(Configuration 1) An operation management device for managing operation of a plurality of electronic control devices installed on a vehicle, the operation management device including: an update management unit configured to: receive a download instruction to download updated data from an external device outside the vehicle; and deliver the received updated data to an electronic control device and instruct the electronic control device to write the updated data, the updated data including an updated program for the electronic control device, the electronic control device being at least one of the electronic control devices, the electronic control device being a target device for downloading the updated data; and a failure diagnosis unit configured to execute failure diagnosis for the electronic control devices, wherein when the update management unit instructs any of the electronic control devices to write the updated data, the update management unit prohibits the failure diagnosis unit from executing the failure diagnosis.

The operation management device of configuration 1 makes it possible to prevent detection of unnecessary operational abnormality in the electronic control device to prevent generation of unnecessary power consumption in downloading updated data to the electronic control device, thereby leading to efficient downloading.

(Configuration 2) The operation management device according to configuration 1, each of the plurality of electronic control devices being connected to the operation management device either directly through a communication transmission line to be able to communicate with each other or indirectly through the communication transmission line and at least one of the electronic control devices other than the electronic control device to be able to communicate with each other, the operation management device further including: an activation management unit configured to manage an activation configuration, the activation configuration being information indicating an activation order of the plurality of electronic control devices; and an activation unit configured to activate the electronic control devices, wherein the update management unit prohibits execution of diagnostic operation and then notifies the target device to the activation management unit based on the download instruction, the activation management unit notifies an electronic control device and an update activation configuration to the activation unit, the electronic control device being at least one of the electronic control devices, the electronic control device needing to be activated to establish communication between the update management unit and the target device, the update activation configuration being the activation configuration indicating an activation order, and the activation unit activates the electronic control device needing to be activated, according to the update activation configuration.

The operation management device of configuration 2 allows the activation unit to activate no unnecessary electronic control devices, therefore to generate no unnecessary power consumption, and to efficiently activate the electronic control device necessary for delivering updated data to the electronic control device that is the target device.

(Configuration 3) The operation management device according to configuration 2, wherein the failure diagnosis unit executes failure diagnosis for the electronic control device indicated in the update activation configuration after the activation unit activates the electronic control device according to the update activation configuration.

The operation management device of configuration 3 allows the failure diagnosis unit to execute failure diagnosis for the electronic control device that has been actually activated, thereby preventing detection of unnecessary operational abnormality and generation of unnecessary power consumption.

(Configuration 4) The operation management device according to configuration 3, wherein the plurality of electronic control devices, the operation management device, and the communication transmission line configure a communication network, and the communication network includes at least one transmission line switch that switches connection in the communication transmission line, the activation management unit manages a network configuration that indicates a state to be set for the transmission line switch in the communication network, the activation management unit notifies an update network configuration to the activation unit, the update network configuration being the network configuration for establishing communication between the update management unit and the target device, and the activation unit switches the transmission line switch according to the update network configuration, and then activates the electronic control device needing to be activated, according to the update activation configuration.

The operation management device of configuration 4 allows the activation management unit to cause the activation unit to implement, for example, the state of the transmission line switch 6 in which the update network configuration can establish communication between the update management unit 13 and the target device most efficiently, thereby executing download further efficiently.

(Configuration 5) The operation management device according to configuration 4, wherein when the target device ends writing of the updated data, the update management unit prohibits the failure diagnosis unit from executing the failure diagnosis, the activation management unit notifies, to the activation unit, the network configuration used before notifying the update network configuration to the activation unit, and the activation unit switches the transmission line switch according to the network configuration notified from the activation management unit.

The operation management device of configuration 5 restores the configuration to the previous network configuration when the vehicle 1 is powered off. This makes it possible to activate the electronic control devices 4 according to a normal activation sequence in the vehicle 1 when the vehicle 1 is powered on next time and to activate the vehicle 1 with the responsiveness maintained.

(Configuration 6) An operation management method to be performed by a computer of an operation management device, the operation management device managing operation of a plurality of electronic control devices installed on a vehicle, the method including: a step of receiving a download instruction to download updated data from an external device outside the vehicle, the updated data including an updated program for an electronic control device, the electronic control device being at least one of the electronic control devices; a step of prohibiting execution of failure diagnosis for the electronic control devices; and a step of delivering the received updated data to the electronic control device and instructing the electronic control device to write the updated data, the electronic control device being a target device for downloading the updated data.

The operation management method of configuration 6 makes it possible to prevent detection of unnecessary operational abnormality in the electronic control device to prevent generation of unnecessary power consumption in downloading updated data to the electronic control device, thereby leading to efficient downloading.

REFERENCE SIGNS LIST

1 . . . vehicle, 2 . . . operation management device, 3 . . . communication network, 4, 4a, 4b, 4c, 4d, 4e, 4f, 4g, 4h, 4i . . . electronic control device, 5, 5a, 5b, 5c, 5d, 5e, 5f, 5g, 5h, 5i, 5j, 5k, 5m . . . communication transmission line, 6 . . . transmission line switch, 10 . . . processor, 11 . . . memory, 12 . . . communicator, 13 . . . update management unit, 14 . . . failure diagnosis unit, 15 . . . activation management unit, 16 . . . activation unit, 17 . . . management program

What is claimed is:

1. An operation management device for managing operation of a plurality of electronic control devices installed on a vehicle, the operation management device comprising a processor that includes:
   an update management unit configured to: receive a download instruction to download updated data from an external device outside the vehicle; and deliver the downloaded updated data to an electronic control device and instruct the electronic control device to write the updated data, the updated data including an updated program for the electronic control device, the electronic control device being at least one of the plurality of electronic control devices, the electronic control device being a target device for downloading the updated data; and
   a failure diagnosis unit configured to execute failure diagnosis for the plurality of electronic control devices,
   wherein when the update management unit instructs any of the plurality of electronic control devices to write the updated data, the update management unit prohibits the failure diagnosis unit from executing the failure diagnosis.

2. The operation management device according to claim 1, each of the plurality of electronic control devices being connected to the operation management device either directly through a communication transmission line to be able to communicate with each other or being connected indirectly through the communication transmission line and to at least one of the plurality of electronic control devices other than the electronic control device to be able to communicate with each other, the processor of the operation management device further including:
   an activation management unit configured to manage an activation configuration, the activation configuration being information indicating an activation order of the plurality of electronic control devices; and
   an activation unit configured to activate the plurality of electronic control devices,
   wherein the update management unit prohibits execution of diagnostic operation and then notifies the target device to the activation management unit based on the download instruction,
   the activation management unit notifies an electronic control device and an update activation configuration to the activation unit, the electronic control device notified to the activation unit being at least one of the plurality of electronic control devices and needing to be activated to establish communication between the update management unit and the target device, the update activation configuration being the activation configuration indicating an activation order, and
   the activation unit activates the electronic control device needing to be activated, according to the update activation configuration.

3. The operation management device according to claim 2, wherein
   the failure diagnosis unit executes failure diagnosis for an electronic control device indicated in the update activation configuration after the activation unit activates the electronic control device indicated in the update activation configuration according to the update activation configuration.

4. The operation management device according to claim 3, wherein
the plurality of electronic control devices, the operation management device, and the communication transmission line configure a communication network, and the communication network includes at least one transmission line switch that switches connection in the communication transmission line,
the activation management unit manages a network configuration that indicates a state to be set for the transmission line switch in the communication network,
the activation management unit notifies an update network configuration to the activation unit, the update network configuration being a network configuration for establishing communication between the update management unit and the target device, and
the activation unit switches the transmission line switch according to the update network configuration, and then activates the electronic control device needing to be activated, according to the update activation configuration.

5. The operation management device according to claim 4, wherein
when the target device ends writing of the updated data, the update management unit prohibits the failure diagnosis unit from executing the failure diagnosis,
the activation management unit notifies, to the activation unit, a network configuration used before notifying the update network configuration to the activation unit, and
the activation unit switches the transmission line switch according to the update network configuration notified from the activation management unit.

6. An operation management method to be performed by a computer of an operation management device, the operation management device managing operation of a plurality of electronic control devices installed on a vehicle, the method comprising:
an update management step of receiving a download instruction to download updated data from an external device outside the vehicle,
and
delivering the downloaded updated data to the electronic control device and instructing the electronic control device to write the updated data, the updated data including an updated program for the electronic control device, the electronic control device being at least one of the plurality of electronic control devices, the electronic control device being a target device for downloading the updated data; and
a failure diagnosis step of, when not prohibited, executing failure diagnosis for the plurality of electronic control devices,
wherein when, in the update management step, any of the electronic control devices is instructed to write the updated data, the failure diagnosis step is prohibited from executing the failure diagnosis for the plurality of electronic control devices.

* * * * *